United States Patent
Locher et al.

(10) Patent No.: US 11,438,380 B2
(45) Date of Patent: Sep. 6, 2022

(54) METHOD AND COMPUTING DEVICE FOR COMMISSIONING AN INDUSTRIAL AUTOMATION CONTROL SYSTEM

(71) Applicant: ABB Schweiz AG, Baden (CH)

(72) Inventors: Thomas Locher, Zürich (CH); Thanikesavan Sivanthi, Birmenstorf AG (CH)

(73) Assignee: ABB SCHWEIZ AG, Baden (CH)

( * ) Notice: Subject to any disclaimer, the term of this patent is extended or adjusted under 35 U.S.C. 154(b) by 983 days.

(21) Appl. No.: 16/131,194

(22) Filed: Sep. 14, 2018

(65) Prior Publication Data

US 2019/0081984 A1    Mar. 14, 2019

(30) Foreign Application Priority Data

Sep. 14, 2017 (LU) .................... LU100440

(51) Int. Cl.
| | |
|---|---|
| *G06F 21/57* | (2013.01) |
| *H04L 9/40* | (2022.01) |
| *G05B 19/418* | (2006.01) |
| *G06F 11/36* | (2006.01) |

(52) U.S. Cl.
CPC .......... *H04L 63/20* (2013.01); *G05B 19/4184* (2013.01); *G05B 19/41835* (2013.01); *G06F 11/36* (2013.01); *G06F 21/57* (2013.01); *G05B 2219/45103* (2013.01)

(58) Field of Classification Search
CPC ............ G05B 19/418; G05B 19/41835; G05B 19/4184; G05B 2219/45103; G05B 2219/50123; G06F 11/36; G06F 21/57; H04L 63/20; Y02P 90/02

See application file for complete search history.

(56) References Cited

U.S. PATENT DOCUMENTS

| | | | |
|---|---|---|---|
| 10,320,613 B1* | 6/2019 | Cam-Winget | H04W 4/70 |
| 2004/0117624 A1* | 6/2004 | Brandt | G06N 20/00 |
| | | | 713/166 |
| 2012/0266209 A1* | 10/2012 | Gooding | H04L 63/20 |
| | | | 726/1 |
| 2013/0031037 A1 | 1/2013 | Brandt et al. | |

(Continued)

FOREIGN PATENT DOCUMENTS

| | | |
|---|---|---|
| CN | 106909657 A | 6/2017 |
| WO | 2014031988 A1 | 2/2014 |
| WO | 2017157996 A1 | 9/2017 |

OTHER PUBLICATIONS

H. Hadeli, R. Schierholz, M. Braendle and C. Tuduce, "Leveraging determinism in industrial control systems for advanced anomaly detection and reliable security configuration," 2009 IEEE Conference on Emerging Technologies & Factory Automation, 2009, pp. 1-8, (Year: 2009).*

(Continued)

*Primary Examiner* — Theodore C Parsons
(74) *Attorney, Agent, or Firm* — Greenberg Traurig, LLP (57) ABSTRACT

To commission an industrial automation control system, IACS, a computing device generates commands to automatically set or verify a security configuration of the IACS. The commands are generated by the computing device based on a machine-readable security baseline, and, optionally, based on a machine-readable configuration file of the IACS.

20 Claims, 5 Drawing Sheets

(56) References Cited

U.S. PATENT DOCUMENTS

| | | | | |
|---|---|---|---|---|
| 2015/0058619 A1* | 2/2015 | Sweet | .................. | H04L 9/3247 |
| | | | | 713/155 |
| 2015/0281278 A1* | 10/2015 | Gooding | ................ | H04L 63/14 |
| | | | | 726/1 |
| 2016/0350559 A1* | 12/2016 | Wilkinson | .............. | G06F 21/70 |

OTHER PUBLICATIONS

M. Cheminod, L. Durante and A. Valenzano, "System configuration check against security policies in industrial networks," 7th IEEE International Symposium on Industrial Embedded Systems (SIES'12), 2012, pp. 247-265, (Year: 2012).*

P. E. Weerathunga and A. Cioraca, "Securing IEDs against cyber threats in critical substation automation and industrial control systems," 2017 70th Annual Conference for Protective Relay Engineers (CPRE), 2017, pp. 1-20, (Year: 2017).*

Luxembourg Patent Office, Search Report issued in corresponding Application No. LU100440, dated Jun. 18, 2018, 9 pp.

European Patent Office, Extended European Search Report in corresponding Application No. 18194245.9, dated Feb. 13, 2019, 8 pp.

M. N. Alsaleh et al., "SCAP Based Configuration Analytics for Comprehensive Compliance Checking," 2011 4th Symposium on Configuration Analytics and Automation (SAFECONFIG), dated Dec. 27, 2011, 8 pp., IEEE, New York, USA.

* cited by examiner

METHOD AND COMPUTING DEVICE FOR COMMISSIONING AN INDUSTRIAL AUTOMATION CONTROL SYSTEM

FIELD OF THE INVENTION

The invention relates to methods and devices for commissioning an industrial automation control system. The invention relates in particular to methods and devices for setting and/or verifying a security of an industrial automation control system, in particular of a substation automation system.

BACKGROUND OF THE INVENTION

Industrial automation control systems (IACSs) are widely used. Substation automation (SA) systems are exemplary for an IACS. The IACS comprises primary devices. For a substation, the primary devices may be electrical cables, lines, bus bars, switches, power transformers and instrument transformers, which may be arranged in switch yards and/or bays. The primary devices are operated in an automated way via a SA system. The SA system, or more generally the IACS, comprises secondary devices, which may include Intelligent Electronic Devices (IED), responsible for the protection, control and monitoring of the primary devices. Protection relays are exemplary for secondary devices of a SA system.

An IACS must be commissioned before it starts operation. Commissioning may also be required when primary or secondary devices or an IED is exchanged or installed. Commissioning is a time-consuming and error-prone task. Exemplary techniques that assist a commissioning engineer in commissioning are described in, e.g., EP 1 850 447 A1 or EP 2 109 204 A1. P. Hoffmann et al., "Virtual Commissioning of Manufacturing Systems a Review and New Approaches for Simplification", ECMS, pages 175-181, 2010, and N. Moreno et al., "Case Study: IEC 61850 as Automation Standard for New Substations at CFE, Practical Experiences", Proc. 12th Annual Western Power Delivery Automation Conference, Spokane, Wash., USA, 2010 disclose further exemplary commissioning techniques. These techniques are not specifically directed to setting and/or validating a system security configuration.

Security-related parameters of IED(s) or other devices of the IACS, which can be collectively referred to as "security configuration," are of considerable importance in view of system reliability and the protection against security threats. In order to set and/or validate a security configuration, an engineer conventionally had to work through a document defining the desired security configuration and describing tests to verify the correct functioning of a networked device or system, also referred to as baseline. For illustration, the baseline may require the engineer to activate an internal firewall or to restrict user access rights according to a given rule set, etc. Since setting the security configuration conventionally involves user interaction, it is both time-consuming and error-prone. Misconfigurations may cause a suboptimal operation, for example because the wrong ports are open or closed, or even a complete malfunction of the device or system.

SUMMARY

It is an object of the invention to provide improved methods and devices for commissioning an industrial automation control system (IACS). It is an object of the invention to provide improved methods and devices for commissioning an IACS, which mitigate the risk that security parameters of an intelligent electronic device (IED) or of the whole the IACS are incorrectly configured. It is an object of the invention to provide methods and devices that reduce the time required for an engineer to set and/or validate a security configuration.

According to embodiments, methods and devices are provided which assist an engineer in setting and/or verifying a security configuration of one or several networked devices of an IACS. To this end, a computing device is provided to at least partially automate the system security configuration and verification. The computing device may enable a commissioning engineer to trigger all the needed configuration changes and the execution of verification tests.

According to embodiments of the invention, a machine-readable security baseline may be derived automatically from a human readable textual security baseline specification. The human readable textual security baseline specification may be a human-readable textual description of the security configuration process, for example.

According to embodiments of the invention, the computing device may perform verification tasks that are not restricted to a state-based verification, but which may also cover a behavior-based verification. In a behavior-based verification, the correctness of the configuration is verified by testing the security-related behavior of one or several networked devices or of the whole IACS in response to a certain set of test inputs.

The commands used to set or verify a security configuration are generated automatically by a computing device based on a machine-readable security baseline. The generation of the commands that are used to set and/or verify parameters relating to system security is automated, thereby reducing the work-time required by an engineer for commissioning and mitigating the risk of an incorrect configuration of system security settings.

A method of commissioning an IACS according to an aspect of the invention comprises generating, by a computing device, commands to automatically set or verify a security configuration of the IACS. The commands are generated by the computing device based on a machine-readable security baseline.

Optionally, the commands may be generated based on both the machine-readable security baseline and a machine-readable configuration file of the IACS.

While the computing device automatically generates the commands based on the machine-readable security baseline, the generation of the commands may still be triggered by a human engineer. However, the human engineer does not need to have any knowledge of the information included in the machine-readable security baseline, because the required commands are generated automatically by the computing device based on the machine-readable security baseline. This allows the computing device to perform the required actions, i.e., setting a security configuration and/or verifying the security configuration, without requiring human intervention once the process has been triggered by the engineer.

The machine-readable security baseline may be a formal baseline having a standard format for security baselines.

The machine-readable security baseline may include the commands that are output by the computing device to set and/or verify the security configuration.

The machine-readable security baseline may have Security Content Automation Protocol (SCAP) format or an Extensible Configuration Checklist Description Format (XCCDF).

The machine-readable configuration file may be a substation configuration language (SCL) file. The computing device may take the machine-readable configuration file into account to retrieve information on a logical data flow during operation of the IACS and/or on a topology of the IACS, when generating the commands to set and/or verify the security configuration. At least one of the commands may be generated also based on the machine-readable configuration file.

The method may further comprise automatically generating the machine-readable security baseline.

Automatically generating the machine readable security baseline may comprise analyzing a textual security baseline specification.

The textual security baseline specification may be an Extensible Markup Language (XML) specification.

Analyzing the textual security baseline specification may comprise parsing the textual security baseline specification to extract the machine-readable security baseline from the textual security baseline specification. This may in particular be an option if the textual security baseline specification already contains the commands that must be input to the IACS to change or verify security-related settings. In this case, the textual security baseline specification only has to be parsed to identify the relevant commands.

Analyzing the textual security baseline specification may comprise performing pattern matching and/or semantic analysis to extract security objectives from the textual security baseline specification. The textual security baseline specification may comprise multiple documents providing information about what needs to be changed and tested in a human-readable text form. Analyzing the multiple documents may comprise extracting the security objectives from the documents, e.g., using machine learning techniques such as pattern matching and semantic analysis. An internal knowledge database may then be used to define the required commands to achieve these objectives. The result may be output in the form of a machine-readable security baseline, e.g., a formal baseline.

Analyzing the textual security baseline specification may comprise retrieving information on a logical data flow during operation of the IACS and/or on a topology of the IACS from the machine-readable configuration file and using this information to generate the machine-readable security baseline.

The textual security baseline specification may be a human-readable textual specification.

The commands generated by the computing device may comprise commands generated to perform a behavior-based verification of the security configuration.

The behavior-based verification of the security configuration may comprise testing a behavior of at least one IED of the IACS in response to a set of test inputs.

The behavior-based verification of the security configuration may comprise testing the behavior of a plurality of IEDs of the IACS in response to the set of test inputs.

In the behavior-based verification, the correctness of the configuration may be verified by testing the behavior of the IED(s) or IACS, thereby verifying that the security-related response behavior of the IED(s) or IACS is as expected.

The method may further comprise performing a state-based verification of the security configuration in addition to the behavior-based verification of the security configuration. In state-based verification, the goal is to ensure that a device or system parameter has the right value or lies in the right range.

The verification of the security configuration may be implemented in various ways. For illustration, the computing device may interact with a dedicated agent executed on an IED of the IACS, which provides test results obtained in behavior-based verification and/or state-based verification to the computing device. The agent executed on the IED may interact with other IEDs of the IACS to aggregate and optionally process test results prior to transmission to the computing device.

Alternatively, the computing device may directly interact with applications running on an IED to retrieve the test results obtained in behavior-based verification and/or state-based verification.

The method may further comprise processing, by the computing device, information received from applications executed by the at least one IED in response to the commands to verify the security configuration.

The method may further comprise retrieving, by an agent executed on at least one IED of the IACS, information relating to the security configuration, and transmitting, by the agent, the information relating to the security configuration to the computing device. The agent may retrieve and transmit the information in response to receiving the command from the computing device.

The IACS may be a SA system.

A computing device for commissioning an IACS according to an aspect of the invention comprises a data storage device storing a machine-readable security baseline, and a processor configured to generate commands to automatically set or verify a security configuration of the IACS based on the machine-readable security baseline.

The computing device may be configured to perform the method according to an embodiment.

A system according to an embodiment of the invention comprises an IACS and the computing device for commissioning the IACS.

A computer program according to an aspect of the invention comprises instruction code which, when executed by a processor of a computing device, causes the computing device to perform the method according to an embodiment.

A baseline extractor according to an embodiment comprises a processor configured to generate, based on a textual security baseline specification, a machine-readable security baseline defining commands to set and/or verify a security configuration of the IACS.

The processor of the baseline extractor may be configured to parse the textual security baseline specification to identify commands included therein.

The processor of the baseline extractor may be configured to identify security objectives for the IACS by analyzing at least one document of the textual security baseline specification.

The processor of the baseline extractor may be configured to use machine learning techniques, such as pattern matching and semantic analysis, to identify the security objectives for the IACS.

The baseline extractor may comprise a knowledge database. The knowledge database may define commands that are suitable to set and/or verify a security configuration required to ensure that given security objectives are met. The processor of the baseline extractor may use the knowledge database in combination with the identified security objectives to define the commands for setting and/or verifying the security configuration of the IACS.

The commands may be stored in a formal baseline, e.g., a machine-readable security baseline in SCAP format or XCCDF.

The baseline extractor may comprise an interface to store the machine-readable security baseline in the storage device of the computing device according to an embodiment.

According to another aspect of the invention, a system comprises a computing device according to an embodiment and a baseline extractor according to an embodiment.

The method, computing device, and baseline extractor according to embodiments of the invention allow the commands required to set or verify a security configuration of the IACS to be automatically generated by a computing device, based on a machine-readable security baseline. The machine-readable security baseline may in particular be a formal security baseline, having, e.g., SCAP format or XCCDF. The time required for commissioning the security-relevant settings of the IACS is reduced with the aid of the methods and computing devices according to embodiments. The risk of misconfigurations is reduced, making the methods and computing devices particularly suitable for security-aware customers.

BRIEF DESCRIPTION OF THE DRAWINGS

The subject-matter of the invention will be explained in more detail with reference to preferred exemplary embodiments which are illustrated in the attached drawings, in which.

DETAILED DESCRIPTION OF EMBODIMENTS

Exemplary embodiments of the invention will be described with reference to the drawings in which identical or similar reference signs designate identical or similar elements. While some embodiments will be described in the context of a substation automation (SA) system, the methods and devices described in detail below may be used in a wide variety of industrial automation control systems (IACSs). The features of embodiments may be combined with each other, unless specifically noted otherwise.

Figure 1:
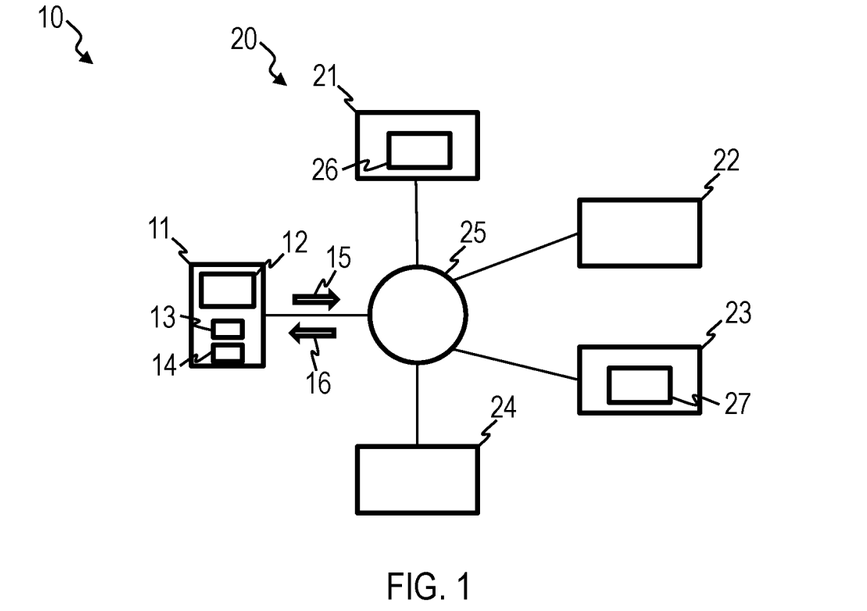
FIG. 1 is a schematic representation of an industrial automation control systems (IACS) and a computing device for commissioning the IACS according to an embodiment.

FIG. 1 is a schematic representation of a system 10 which comprises an IACS 20 and a computing device 11. The IACS 20 may be a SA system. The IACS 20 comprises plural networked devices 21-24. The plural networked devices 21-24 may comprise intelligent electronic devices (IEDs). The plural networked devices 21-24 may respectively comprise a merging unit (MU), a sensor, or other networked devices. The IACS 20 may comprise one or plural switches 25, e.g., Ethernet switches. The networked devices 21-24 may communicate with each other over a switched communication network including the switch(es) 25.

At least some of the networked devices 21-24 may be configured to measure and/or process parameters of the IACS. Exemplary IACS parameters may comprise, without limitation, currents, voltages, circuit breaker positions, gas concentrations, or other parameters relating to operation of a SA system.

The computing device 11 may be a mobile device, in particular a portable device. The computing device 11 is communicatively coupled with the IACS 20 for setting and/or verifying a security configuration. The computing device 11 may be used for commissioning the IACS 20 prior to operation of the IACS 20, after a new networked device has been added, or when a networked device has been exchanged.

In order to set a security configuration, the computing device 11 may set one or several security-related parameter values of at least one of the networked devices 21-24 and in particular of several networked devices 21-24. The security-related parameter values may include parameters of a threat detection mechanism, such as a firewall. The security-related parameter values may include parameters that define the states of ports and/or the times for which ports remain open. The security-related parameter values may include parameters that access restrictions, such as password policies. The security-related parameter values define or affect the behavior of one or several of the networked devices 21-24 in response to a security threat.

In order to verify a security configuration, the computing device 11 may perform one or several tests to verify that the IACS 20 reacts as expected in response to a set of test inputs. The computing device 11 may perform an automated behavior-based verification of the system security configuration, in which the security-related behavior of one or several networked devices 21-24 in response to a set of automatically generated test inputs is detected and evaluated. The computing device 11 may additionally perform an automated state-based verification of the system security configuration, in which the security-related states of one or several networked devices 21-24 in response to a set of test inputs is detected and evaluated.

The computing device 11 is operative to assist an engineer in the tasks of setting and/or verifying a security configuration of the IACS 20. The computing device 11 is configured to automatically generate commands for setting and/or verifying the security configuration of the IACS 20. The computing device 11 may automatically generate the commands for setting and/or verifying the security configuration of the IACS 20 based on a machine-readable security baseline stored in a storage device 14 of the computing device 11. The machine-readable security baseline may be a formal baseline. The machine-readable security baseline may have Security Content Automation Protocol (SCAP) format or Extensible Configuration Checklist Description Format (XCCDF).

The machine-readable security baseline may include a list of commands that are to be issued to one, several, or all of the networked devices 21-24 to set a security configuration. The machine-readable security baseline may include a list of further commands that are to be issued to one, several, or all of the networked devices 21-24 to verify a security configuration. The further commands issued by the computing device 11 to verify a security configuration may define test inputs. At least some of the test inputs may trigger a security-related behavior of the IACS 20 that may be monitored and evaluated by the computing device 11.

The computing device 11 comprises a processor 13. The processor 13 is operatively coupled to the storage device 14. The processor 13 is configured to generate the commands 15 to set and/or verify the security configuration based on the machine-readable security baseline stored in the storage device 14. The storage device 14 may optionally store a machine-readable configuration file of the IACS 20, such as a SCL file, of the IACS 20. The machine-readable configuration file may include information on a topology and data flows in the IACS 20. The machine-readable configuration file may include one or several message blocks that define messages transmitted from an intelligent electronic device (IED) of the IACS 20 to one or several other IEDs of the IACS 20. Data flows in the IACS 20 may be derivable from such message block(s).

Optionally, the computing device 11 may additionally use a machine-readable configuration file, such as a SCL file, of the IACS 20 in the process of automatically generating commands to set and/or verify the security configuration.

The computing device 11 is configured to automatically generate the commands 15 to set and/or verify the security configuration of the IACS 20. It will be appreciated that, as used herein, the term "automatically generating commands" means that the computing device 11 uses the machine-readable security baseline stored in the storage device 14 to automatically determine which commands are to be output to the IACS 20. The term "automatically generating commands" does not preclude that a user triggers the automatic generation of commands 15. For illustration, the computing device 11 may have a human machine interface (HMI) 12 that allows the user, e.g. a commissioning engineer, to initiate the process of setting the security configuration, which causes the computing device 11 to automatically generate the required commands for setting the security configuration based on that machine-readable security baseline. Once the process of setting the security configuration has been initiated, the computing device 11 may automatically generate a plurality of commands 15, which may also be directed to different ones of the networked devices 21-24, to set the security configuration. Alternatively, the computing device 11 may generate commands 15 directed to just one of the networked devices 21, on which an agent 26 is executed. The agent may coordinate and distribute the commands for setting the security configuration.

The HMI 12 may allow the user to initiate the process of verifying the security configuration, which causes the computing device 11 to automatically generate the required commands for setting the security configuration based on that machine-readable security baseline. Once the process of verifying the security configuration has been initiated, the computing device 11 may automatically generate a plurality of commands 15, which may be directed to different ones of the networked devices 21-24, to verify the security configuration. The computing device 11 may monitor a state and/or a behavior of at least one, and preferably several or all of the networked devices 21-24, in response to a set of test inputs provided in the commands 15 to test the security-related behavior of the IACS 20. Information 16 on the state and/or behavior of the networked devices 21-24 may be collected and evaluated by the computing device 11. One or several agents 26, 27 executed by at least one of the networked devices 21, 23 may assist the computing device 11 in the process of aggregating, filtering, and evaluating the response to a set of test inputs.

The machine-readable security baseline that is used by the computing device 11 in the process of automatically generating commands to set and/or verify the security configuration may be automatically generated. Methods according to embodiments may comprise the step of automatically generating the machine-readable security baseline based on one or several documents providing textual specification of the desired security settings or of the security configuration process. The machine-readable security baseline may be generated by a baseline extractor that may be executed by the computing device 11 or that may be separate from the computing device 11. The baseline extractor may be executed on a server different from the computing device 11.

The process of automatically generating the machine-readable security baseline may comprise parsing the one or several documents of textual specification of the security settings. If the textual specification of the security settings is a human-readable textual description of the security configuration process or of security objectives that are to be attained, the process of automatically generating the machine-readable security baseline may comprise extracting the security objectives from the human-readable textual description, e.g., using machine learning techniques such as pattern matching and semantic analysis, and then using an internal knowledge base to define the required commands to achieve these security objectives. The result, which may include the commands used to set and/or verify the security configuration, may be output by the baseline extractor in the form of a machine-readable security baseline, in particular a formal baseline, used by the computing device 11.

Figure 2:
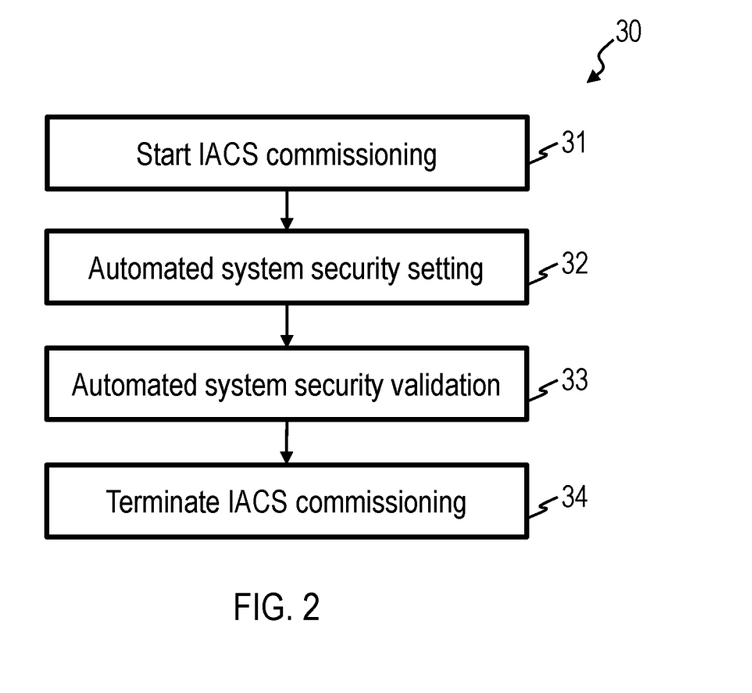
FIG. 2 is a flow chart of a method according to an embodiment.

FIG. 2 is a flow chart 30 of a method according to an embodiment. The method may be performed automatically by the computing device 11 according to an embodiment. At step 31, commissioning of the IACS 20 is started. Commissioning of the IACS 20 may be performed before the IACS 20 starts operating for the first time. Commissioning of the IACS 20 may also be performed when one of the networked devices, for example one of the IEDs, is exchanged or is installed. The commissioning of the IACS 20 may be initiated by a user command received by the computing device 11 at the HMI 12.

At step 32, a process of automatically setting the security configuration of the IACS 20 may be performed. The computing device 11 may automatically generate commands to set a security configuration of the IACS 20, thereby configuring setting security related parameters of one, several or all of the networked devices 21-24. The commands to set the security configuration may be generated based on the machine-readable security baseline stored in the computing device 11, which may define the commands that need to be issued to obtain a desired security-related behavior.

At step 33, a process of automatically verifying the system security configuration of the IACS 20 may be performed. The computing device 11 may automatically generate commands to verify a security configuration of the IACS 20, thereby verifying that the security related parameters result in a desired state and/or behavior of one, several or all of the networked devices 21-24. The commands to verify the security configuration are generated based on the machine-readable security baseline stored in the computing device 11, which may define test inputs simulating security threats that the IACS 20 must withstand. Test results of the security configuration verification may be output via the HMI 12 of the computing device 11. The computing device 11 may also output, via the HMI 12, information on how the system security settings can be modified in view of the test results obtained in the process of verifying the security configuration.

At step 34, the IACS commissioning may be terminated.

At least some of the commands generated to set and/or verify the security configuration at steps 32 and 33 may be generated based on both the machine-readable security baseline and further based on a machine-readable configuration file, such as an SCL file, of the IACS 20. For illustration, the computing device 11 may take the machine-readable configuration file into account to retrieve information on a logical data flow during operation of the IACS 20 and may generate the commands to set and/or verify the security configuration based on both the information on the logical data flow and the machine-readable security baseline. Alternatively or additionally, the computing device 11 may take the machine-readable configuration file into account to retrieve information on a topology of the IACS 20 and may generate the commands to set and/or verify the security configuration based on both the information on the topology and the machine-readable security baseline. The computing device 11 may parse the SCL file to automatically determine the logical data flow and/or topology based on the SCL file. The information on the logical data flow and/or topology or other information determined from the machine-readable configuration file may be used by the computing device 11 to automatically determine which commands are to be generated to set and/or verify the security configuration. Alternatively or additionally, the information on the logical data flow and/or topology or other information determined from the machine-readable configuration file may be used by the computing device 11 to automatically determine to which group(s) of IEDs commands are to be sent to set and/or verify the security configuration.

Various effects are attained by the method and computing device according to embodiments of the invention. For illustration, the method and computing device address the problem that setting and/or verifying security-related parameters during commissioning traditionally required expert knowledge and was both time-consuming and prone to human errors. The method and computing device disclosed herein provide a unified solution to automating the system security verification and/or configuration process.

The method and computing device according to the invention enable a commissioning engineer to trigger the needed configuration changes and the execution of verification tests for a system security configuration. The configuration changes and the verification is then performed in an automated manner. The machine-readable security baseline may be derived automatically from a human-readable textual description of the security configuration process. The method and computing device according to the invention are not restricted to a state-based verification where the goal is to ensure that a device or system parameter has the right value or lies in the right range (e.g., by determining whether the firewall is enabled). The method and computing device according to the invention can also cover behavior-based verification where the correctness of the configuration is verified by testing the behavior of the device or system given a certain set of inputs (e.g., by determining whether a networked device or the IACS 20 reacts to a specific command as expected). As both state-based verification and behavior-based verification can be automated in embodiments of the invention, the commissioning engineer is aided in the task of commissioning the security system of the IACS 20. The method and computing device according to the invention speed up the commissioning phase and reduce the chances of erroneous security configurations, thereby reducing the risk of security incidents. Moreover, the method and computing device according to the invention can be offered as a commissioning service for particularly security-conscious IACS operators.

The machine-readable security baseline may be automatically generated from one or several documents providing a textual security specification of the IACS 20. To this end, a baseline extractor may be used which may be integrated with the computing device 11 or which may be separate therefrom, as will be explained in more detail below.

The baseline extractor may also retrieve information on a logical data flow during operation of the IACS 20 and/or on a topology of the IACS 20 when preparing the machine-readable security baseline. The baseline extractor may retrieve this information from a machine-readable configuration file, such as an SCL file.

Figure 3:
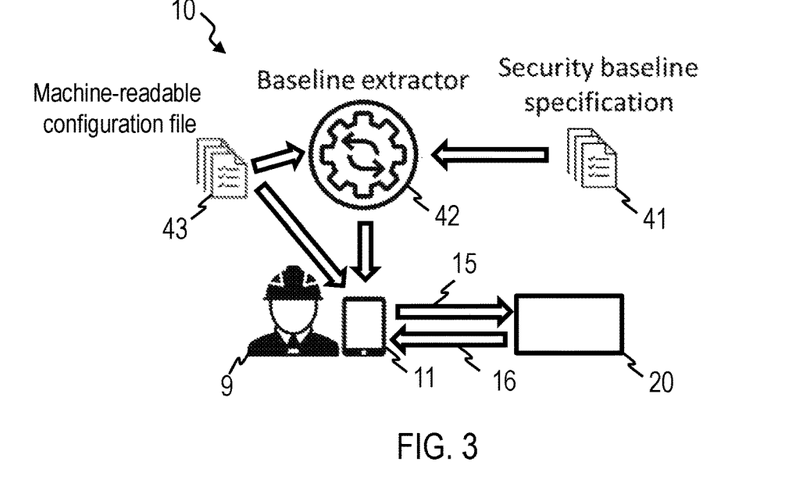
FIG. 3 is a schematic representation of a method according to an embodiment.

FIG. 3 is a schematic representation of a system 10 which comprises an IACS 20 and a computing device 11, which may have a configuration and operation as explained with reference to FIG. 1 and FIG. 2 above. The system 10 further comprises a baseline extractor 42. The baseline extractor 42 is configured to automatically generate the machine-readable security baseline that is used by the computing device 11.

The baseline extractor 42 may comprise a processor configured to generate, based on a textual security baseline specification 41, the machine-readable security baseline defining commands to set and/or verify a security configuration of the IACS 20. The baseline extractor 42 may be configured to parse the textual security baseline specification 41 to identify commands included therein. The baseline extractor 42 may be configured to identify security objectives for the IACS 20 by analyzing at least one document of the textual security baseline specification 41. The baseline extractor 42 may be configured to use machine learning techniques, such as pattern matching and semantic analysis, to identify the security objectives for the IACS 20 from the textual security baseline specification 41. The baseline extractor 42 may comprise a knowledge database. The knowledge database may define commands that are suitable to set and/or verify a security configuration required to ensure that security objectives are met. The respective commands may be defined in the knowledge database for each one of a plurality of sets of security objectives. The baseline extractor 42 may use the knowledge database in combination with the identified security objectives for the IACS 20 to define the commands for setting and/or verifying the security configuration of the IACS 20. The commands may be stored in the formal baseline, e.g., a machine-readable security baseline in SCAP format or XCCDF.

The baseline extractor 42 may comprise an interface to store the machine-readable security baseline in a storage device 14 of the computing device 11. The computing device 11 may subsequently use the machine-readable security baseline generated by the baseline extractor 42 for generating commands 15 to set and/or verify a security configuration of the IACS 20. The computing device 11 may retrieve verification-related data 16 from the IACS 20 in the process of verifying the security configuration.

In order to set and/or verify a security configuration, the baseline extractor 42 may automatically generate a formal baseline (e.g., a SCAP format baseline or a XCCDF baseline) from the textual security baseline specification 41. An engineer 9 may trigger the computing device 11 to issue commands that are based on the machine-readable security baseline determined by the baseline extractor 42, to set security parameters or verify the correct functioning of the system automatically. As will be explained in more detail with reference to FIG. 6 to FIG. 9, the commands may be handled by an agent 26, 27 or by installed services and tools running on the targeted networked devices 21-24. It is also possible for an agent 26 to engage other networked devices in the process of distributing commands and/or aggregating information on security-related behavior.

The computing device 11 and/or the baseline extractor 42 may also take into account a machine-readable configuration file 43, such as an SCL file, of the IACS 20. For illustration, the baseline extractor 42 may parse the machine-readable configuration file 43 to generate the formal security baseline (e.g., a SCAP format baseline or a XCCDF baseline) from the textual security baseline specification 41 in combination with the machine-readable configuration file 43. In exemplary embodiments, information on a topology of the IACS 20 and/or on data flows in the IACS 20 may be retrieved by the baseline extractor 42 from the machine-readable configuration file 43 and may be used to generate the formal security baseline.

Alternatively or additionally, the computing device 11 may parse the machine-readable configuration file 43 to retrieve information on a topology of the IACS 20 and/or on data flows in the IACS 20 therefrom and to use this or other information included in the configuration file 43 in combination with the formal security baseline to generate commands to set and/or verify a security configuration.

The method and computing device according to embodiments do no longer require the engineer 9 to work through written guidelines, in the form of a human-readable security baseline specification 41, on how to set up the IACS 20 securely. The human-readable security baseline specification 41 may be transformed automatically, using, e.g., the baseline extractor 42, into a standard format for security baselines that computers can parse easily. The SCAP format and more specifically the XCCDF component, which is intended for the purpose of writing security checklists, are exemplary for such formats.

For each security setting or test, the machine-readable security baseline may provide a) a description including purpose and criticality, b) a specification on how to change or verify the corresponding setting or run the given test, e.g. by providing commands that need to be executed, and c) a specification of the expected result(s).

It is also possible that the change of a security-relevant system parameter and a test are combined. For illustration, the parameter may be changed first and then a test may verify that the parameter was indeed changed successfully and/or that the parameter change results in the desired behavior.

The computing device 11 of the engineer 9, on which the machine-readable security baseline is stored, can communicate with the networked devices 21-24 of the IACS during commissioning.

Various techniques may be used by the baseline extractor 42 to automatically generate the machine-readable security baseline. Two exemplary techniques will be explained in more detail with reference to FIG. 4 and FIG. 5.

Figure 4:
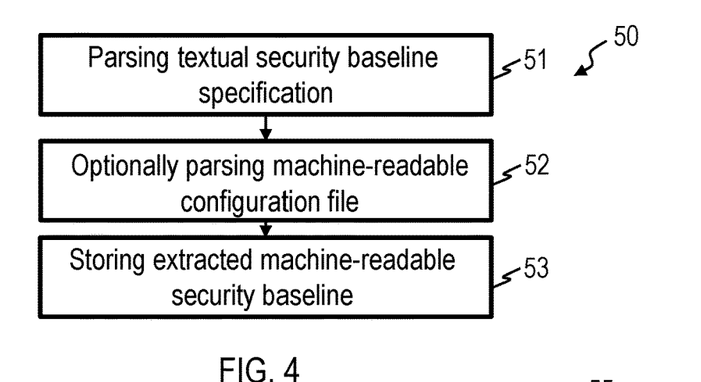
FIG. 4 is a flow chart of a process of generating a machine-readable security baseline in a method according to an embodiment.

FIG. 4 is a flow chart 50 of a process of automatically generating a machine-readable security baseline. The process of FIG. 4 may be used in the method according to an embodiment to generate the machine-readable security baseline. The process of FIG. 4 may in particular be used when the textual security baseline specification 41 already contains commands that must be run to change or verify certain security-related settings. At step 51, the textual security baseline specification 41 is parsed. The baseline extractor 42 may be implemented by a simple parser that extracts the formal security baseline from the textual security baseline specification 41 in FIG. 3. At step 52, a machine-readable configuration file 43, such as an SCL file, of the IACS 20 may optionally be parsed. At step 53, the commands extracted from the textual security baseline specification 41 and, optionally, other information may be stored as machine-readable security baseline, e.g., in SCAP format, XCCDF, or another standardized format that the computing device 11 can easily parse. The commands stored in the machine-readable security baseline may optionally be determined based on the machine-readable configuration file.

Figure 5:
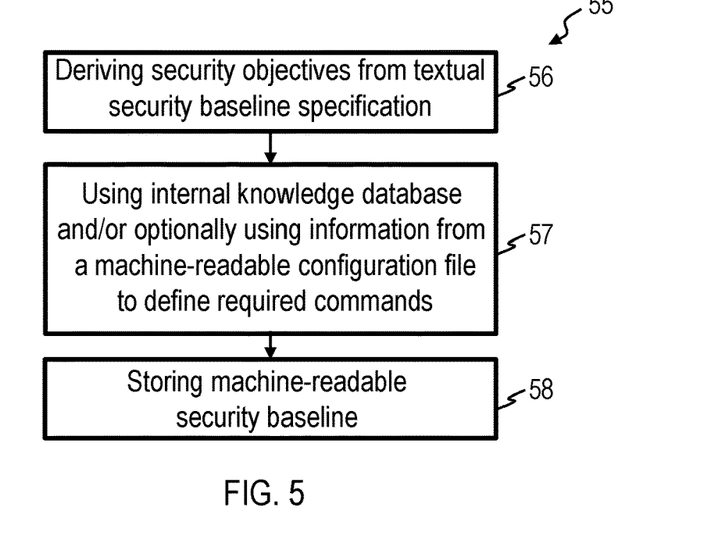
FIG. 5 is a flow chart of a process of generating a machine-readable security baseline in a method according to an embodiment.

FIG. 5 is a flow chart 55 of a process of automatically generating a machine-readable security baseline. The process of FIG. 5 may be used to build the machine-readable security baseline for use by the computing device 11 based on multiple input documents providing information about what needs to be changed and tested in a human-readable text form. At step 56, security objectives are automatically derived from the textual security baseline specification 41 in FIG. 3. The baseline extractor 42 may use machine learning techniques such as pattern matching and semantic analysis to derive the security objectives from the textual security baseline specification 41. At step 57, a knowledge database may be used to identify the commands that are required to achieve the security objectives derived at step 56. Alternatively or additionally, information may be retrieved from a machine-readable configuration file of the IACS 20 to identify the commands that are required to achieve the security objectives derived at step 56. For illustration, information on a topology and/or on data flows of the IACS 20 may be retrieved from a SCL file of the IACS 20 and may be used to determine which commands are required to achieve the security objectives derived at step 56. At step 58, the commands determined based on steps 56 and 57 may be stored as machine-readable security baseline in SCAP format, XCCDF, or another standardized format that the computing device 11 can easily parse.

Additional information may be included in the machine-readable security baseline used by the computing device 11. For illustration, the machine-readable security baseline may provide a description including purpose and criticality and/or information on an expected behavior that may be verified by performing automatic tests.

The machine-readable security baseline is used by the computing device 11 to generate commands that are provided to one or plural IEDs of the IACS 20. A machine-readable configuration file for the IACS 20 may additionally be processed by the computing device 11 to generate at least some of the commands to set and/or verify the security configuration.

The commands may be handled in various ways, as will be explained in more detail with reference to FIG. 6 to FIG. 8.

Figure 6:
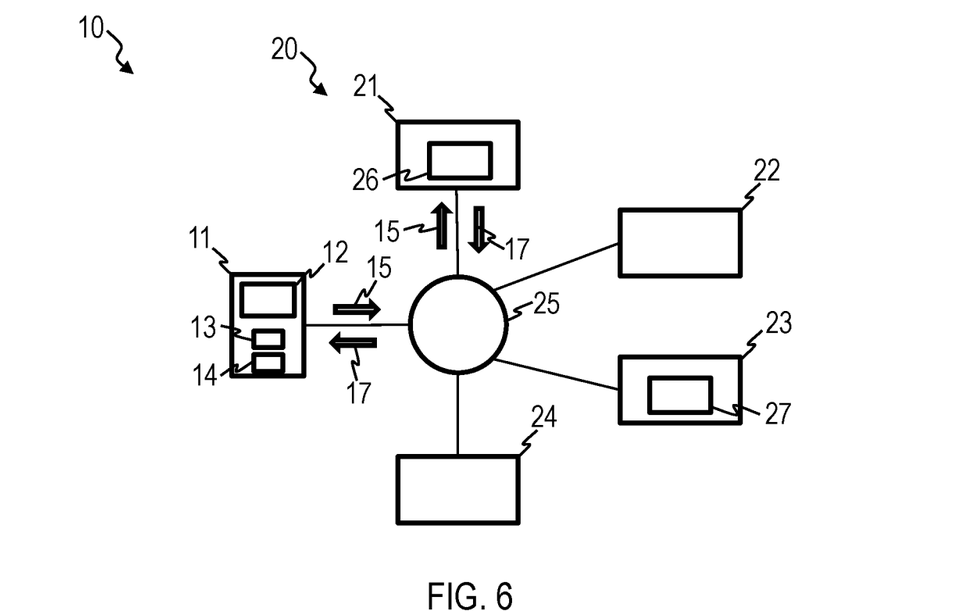
FIG. 6 is a schematic representation of an IACS and a computing device for commissioning the IACS according to an embodiment.

FIG. 6 illustrates the system 10 in which a computing device 11 generates commands 15 to set and/or verify a security configuration. A so-called agent 26 is installed and running on a target networked device 21. The agent 26 has sufficient rights to retrieve information concerning security configuration from running applications as well as the operating system. The agent 26 is a piece of custom instruction code designed to change and verify security-related parameters on the respective networked device 21 and, optionally, security-related parameters in other networked devices 22-24 of the IACS 20. The agent 26 provides information 17 to the computing device 11 in response to at least some of the commands 15. The agent 26 may perform an aggregation and, optionally, processing of security-related data prior to providing the information 17 to the computing device 11.

An advantage of the use of the agent 26 is that the agent 26 can be instructed to return results 17 in any desired format. Moreover, the agent 26 can independently initiate tasks and respond back to the computing device 11. The use of the agent 26 may be beneficial on networked devices 21 which have sufficient resources to readily accommodate execution of the agent 26.

Figure 7:
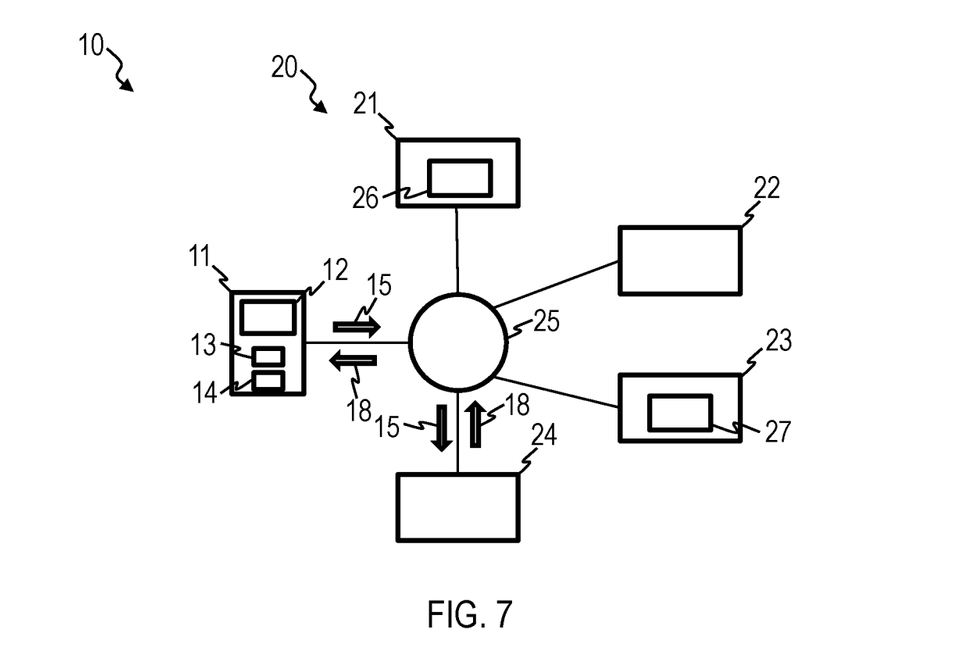
FIG. 7 is a schematic representation of an IACS and a computing device for commissioning the IACS according to an embodiment.

FIG. 7 illustrates the system 10 in which a computing device 11 generates commands 15 to set and/or verify a security configuration. The computing device 11 communicates directly with applications and services miming on the networked device 24. The computing device 11 may optionally communicate directly with applications and services running on one or several other networked device(s) 22. The applications and processes executed on the target networked device 24 may be security-related applications and processes, e.g., a firewall. Information 18 may be retrieved directly from the applications and processes that also need to run on the networked device 24 in normal operation, without requiring a dedicated agent for the purpose of collecting and reporting information to the computing device 11.

The communication scenario illustrated in FIG. 7 does not require a dedicated agent software to run on the networked device 24. However, a larger number of commands and more complex commands may need to be sent to the networked device 24. The computing device 11 may need to clean, filter, and aggregate the returned results 18.

Figure 8:
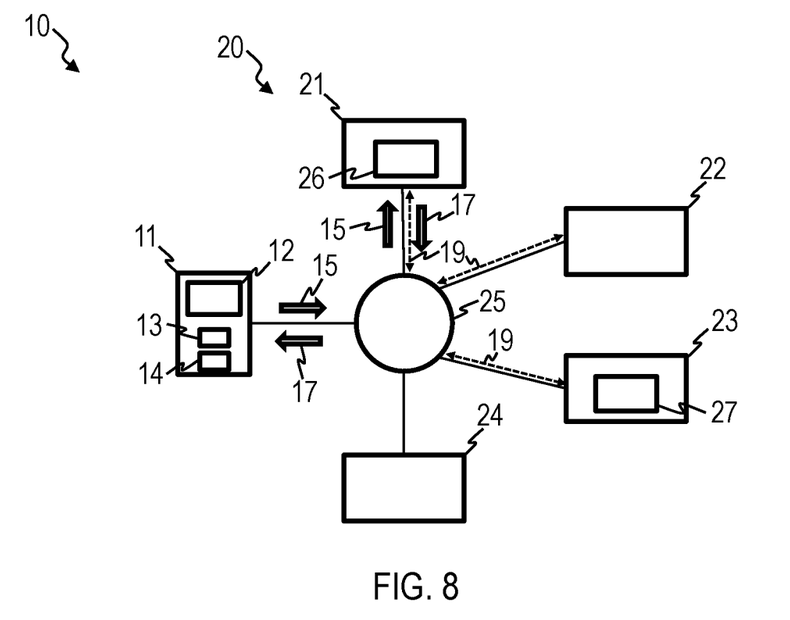
FIG. 8 is a schematic representation of an IACS and a computing device for commissioning the IACS according to an embodiment.

FIG. 8 illustrates the system 10 in which a computing device 11 generates commands 15 to set and/or verify a security configuration. In particular for tests, it is required that the networked devices 21-24 communicate to verify their correct functioning. For example, if a networked device 21 tries to reach another networked device 22-24 on a port that must be closed, the networked device 21 may only be allowed to retrieve certain information from a specific subset of devices etc.

The computing device 11 may trigger an automatic test, which is initiated on a particular networked device 21, which in turn communicates with other networked devices 22, 23 to test a specific security system property. The communication 19 between the networked device 21 and the other networked devices 22, 23 is particularly easy to achieve if the initiating device hosts an agent 26. The agent 26 may also clean, filter, and aggregate the reported data from the other networked devices 22, 23 and may generate a test result 17 for transmission to the computing device 11.

The techniques described with reference to FIG. 6 to FIG. 8 may also be combined with each other.

The methods and devices according to embodiments of the invention may support both state-based verification and behavior-based verification of the system security configuration. State-based verification verifies that a certain system state complies with the security baseline. Exemplary tests performed in state-based verification may include checking that a firewall is enabled, that a session time-out is set to a value not larger than a given maximum, or other tests relating to the set value of a security-related parameter. Behavior-based verification is based on tests whose results indicate whether the configuration causes the IACS 20 to react in a desired manner in response to a security-critical input signal. Behavior-based verification can be used as a secondary test. For illustration, the test that a connection fails may be used as an indicator that the firewall is indeed activated. Behavior-based verification can be used to test out more complex interactions between the devices 21-24 of the IACS 20. For example, a certain access policy may allow only some of the devices 21-24 to connect to certain other devices of the IACS 20. The behavior-based verification may include a test to verify that the access policies are correct on all devices 21-24 of the IACS 20.

Automating behavior-based verification, which may be performed in the methods and by the computing devices disclosed herein, is particularly important as the corresponding tests typically require a significant amount of time when carried out in a non-automated manner by an engineer.

Some changes to the network setup may be required when automating the execution of behavior-based tests. For example, for some manual tests, the commissioning engineer may be required to plug in and plug out certain cables to test re-connection times or test whether some functionality is available on both physical network ports etc. In order to obviate the need for such physical re-connection during performance of a series of tests, all physical connections may be installed. The computing device 11 may issue commands to turn on or off selected connections on a software or application level, so that the tests can run through different connection scenarios without any human intervention. In particular, different connection scenarios may be simulated in software without requiring a physical re-connection of the cables connecting the networked devices.

The methods and computing devices according to embodiments of the invention allow a security configuration to be automatically set and/or verified for a system comprising a potentially large number of networked devices, whose security parameters are configured automatically, in particular during commissioning. The methods and computing devices according to embodiments may use both state-based and behavior-based verification of the system security configuration, which is desirable for a fully automated security verification and configuration mechanism.

The methods and computing devices according to embodiments can be used for various purposes to set and/or verify a security configuration of the IACS 20. Two exemplary use cases will be described with reference to FIG. 9 and FIG. 10 below.

Figure 9:
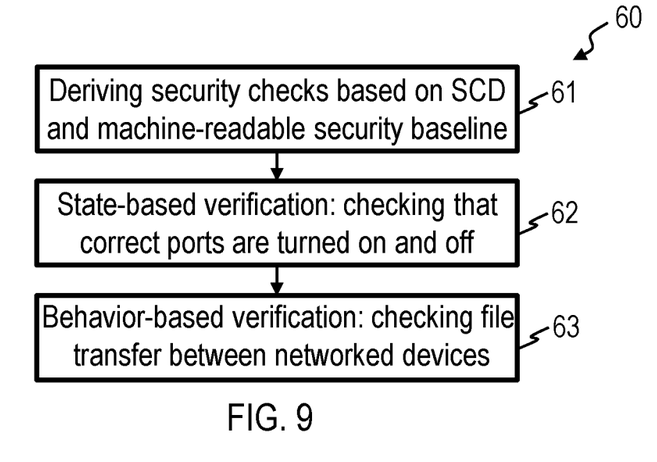
FIG. 9 is flow chart of a method according to an embodiment.

FIG. 9 is a flow chart of a method 60 according to an embodiment. In the method 60, commands are automatically generated for verifying a secure device setup, using a machine-readable security baseline.

Cyber security is a key requirement in SA systems that require device and system level security measures. These measures may include multiple layers of security to offer "defense in depth" protection against threats. The security measures are generally dependent on the system configuration and for this reason can vary from one SA system to another. The security measures are traditionally configured and verified according to a test plan document. The test plan should ensure that at least the minimum requirements for substation cyber security are guaranteed. This project specific test plan document, containing the set of tests required for verifying the minimum substation cyber security requirements, has to be generated manually. In one use case of the present invention, the test plan document is used to automate secure device setup.

The exposure to cyber-attacks of a substation device, e.g., an IED, can be reduced by enabling only the necessary communication ports that are required for normal operation of the device, by permitting only valid protocol communication on these ports and using encryption algorithms for connections (e.g., FTP with TLS encryption) or files (e.g., AES encryption for user credentials file). In order to verify the secure device setup, both state-based verification and behavior-based verification of the security configuration may be required. For example, state-based verification checks that only the necessary ports are turned on and the other ports are turned off. The behavior-based verification checks whether a file can be transferred from the device without TLS encryption through a port that is turned on.

At step 61, the set of security checks needed for verifying the secure setup of the device can be derived based on security specification of the device and a machine-readable configuration file, e.g., Substation Configuration Description (SCD) that provides information on the inbound and outbound connections as well as flows to and from the device. These inputs can be used to generate a description in the Extensible Configuration Checklist Description Format (XCCDF). The secure setup of the device can then be automatically verified based on this XCDDF.

At step 62, a state-based verification of the security configuration of the device is performed based on the XCDDF. The state-based verification may include checking that only the necessary ports are turned on and the other ports are turned off.

At step 63, a behavior-based verification of the security configuration of the device is performed based on the XCDDF. The behavior-based verification may include checking that a file can be transferred from the device without TLS encryption through a port that is turned on.

The results of the state-based verification and/or the behavior-based verification may be output to the commissioning engineer. In particular if either one of the state-based verification and the behavior-based verification has shown that the system security configuration is faulty, changes in the security configuration may be automatically implemented by the computing device 11. Alternatively, the computing device 11 may suggest suitable configuration changes of the system security configuration to the commissioning engineer.

Figure 10:
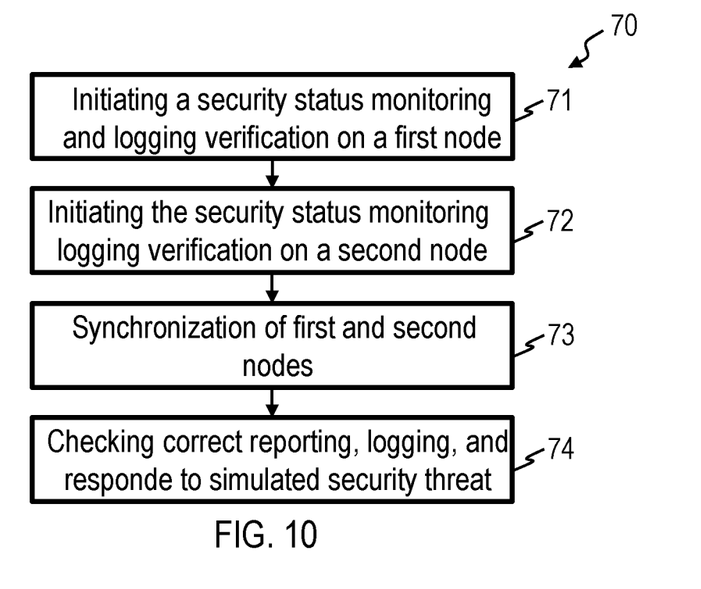
FIG. 10 is flow chart of a method according to an embodiment.

FIG. 10 is a flow chart of a method 70 according to an embodiment. In the method 70, commands are automatically generated for verifying correct security status monitoring and logging, using a machine-readable security baseline.

Security status monitoring and logging is a key feature in SA systems. Security status monitoring and logging is required for detection of threats and for non-repudiation. A device of the SA system, e.g., an IED, should raise an alarm when there is a change in settings that can compromise the device security, e.g., deactivation of user account password policy check. The IED can also log the event in a server, e.g., a SYSLOG server.

Using the present invention for verifying correct security status monitoring and logging may include tests that run both in the IED and the logging server.

At step 71, a test application for verifying correct security status monitoring and logging may be initiated on an IED. The test application running on the IED may make changes to the security settings that should raise alarms to the server if the security configuration is correct.

At step 72, the test application running on the device of the SA system may initiate a further test application running on the logging server. The further test application running on the logging server may check whether the security alarm or log is received and whether this alarm or log is correctly classified and appropriate actions are taken.

At step 73, the further test application running on the logging server synchronizes with the test application running on the IED.

At step 74, the test application running on the IED and the further test application running on the logging server can communicate with each other to verify the correct security status monitoring and logging behavior.

The invention provides techniques that automate the setting and/or verification of a system security configuration. Commands required to set or verify a security configuration of the IACS are automatically generated by a computing device, based on a machine-readable security baseline and, optionally, based on a machine-readable configuration file of the IACS. The machine-readable security baseline may be automatically generated based on a textual baseline specification. The time required for commissioning the security-relevant settings of the IACS is reduced with the aid of the invention. The risk of incorrect system security configurations is reduced.

The invention claimed is:

1. A method of commissioning an industrial automation control system (IACS) the method comprising:
    generating, by a computing device, commands to automatically set or verify a security configuration of the IACS,
        wherein the commands are generated by the computing device based on a machine-readable security baseline,
        wherein the computing device uses information on a logical data flow during operation of the IACS, on a topology of the IACS, or the logical data flow during operation of the IACS and the topology of the IACS from a machine-readable configuration file of the IACS when generating the commands to set, verify, or set and verify the security configuration, and
    commissioning the IACS before the IACS starts operating.

2. The method of claim 1, wherein the commands are generated by the computing device based on both the machine-readable security baseline and a machine-readable configuration file of the IACS.

3. The method of claim 2, further comprising, automatically generating the machine-readable security baseline.

4. The method of claim 3, wherein automatically generating the machine readable security baseline comprises analyzing a textual security baseline specification.

5. The method of claim 4,
    wherein at least one of:
        analyzing the textual security baseline specification comprises parsing the textual security baseline specification to extract the machine-readable security baseline from the textual security baseline specification, or
        analyzing the textual security baseline specification comprises performing pattern matching, semantic analysis, or matching and semantic analysis to extract security objectives from the textual security baseline specification.

6. The method of claim 2, wherein the commands comprise commands generated to perform a behavior-based verification of the security configuration.

7. The method of claim 1, further comprising:
    automatically generating the machine-readable security baseline.

8. The method of claim 7,
wherein automatically generating the machine-readable security baseline comprises analyzing a textual security baseline specification.

9. The method of claim 8,
wherein at least one of:
analyzing the textual security baseline specification comprises parsing the textual security baseline specification to extract the machine-readable security baseline from the textual security baseline specification, or
analyzing the textual security baseline specification comprises performing pattern matching, semantic analysis, or matching and semantic analysis to extract security objectives from the textual security baseline specification.

10. The method of claim 9, wherein the textual security baseline specification is a human-readable textual specification.

11. The method of claim 8,
wherein the textual security baseline specification is a human-readable textual specification.

12. The method of claim 1, wherein the commands comprise commands generated to perform a behavior-based verification of the security configuration.

13. The method of claim 12,
wherein the behavior-based verification of the security configuration comprises testing a behavior of at least one IED of the IACS in response to a set of test inputs.

14. The method of claim 13, wherein the behavior-based verification of the security configuration comprises testing the behavior of a plurality of IEDs of the IACS in response to the set of test inputs.

15. The method of claim 12, further comprising: performing a state-based verification of the security configuration in addition to the behavior-based verification of the security configuration.

16. The method of claim 1, further comprising:
processing by the computing device, information received from application executed by at least one IED of the IACS in response to the commands to verify the security configuration.

17. The method of claim 1, further comprising:
retrieving, by an agent executed on at least one IED of the IACS, information relating to the security configuration in response to the commands, and
transmitting, by the agent, the information relating to the security configuration to the computing device.

18. The method of claim 1,
wherein the IACS is a substation automation (SA) system.

19. A computing device for commissioning an industrial automation control system (IACS) the computing device comprising:
a data storage device storing a machine-readable security baseline; and
a processor configured to generate commands to automatically set or verify a security configuration of the IACS based on the machine-readable security baseline,
wherein the computing device uses information on a logical data flow during operation of the IACS, on a topology of the IACS, or the logical data flow during operation of the IACS and the topology of the IACS from a machine-readable configuration file of the IACS when generating the commands to set, verify, or set and verify the security configuration,
wherein the IACS is commissioned before the IACS starts operating.

20. A memory device comprising:
a set of instructions for commissioning an industrial automation control system (IACS) when executed by a processor of a computing device that are effective to:
generate commands to automatically set or verify a security configuration of the IACS,
wherein the commands are generated by the computing device based on a machine-readable security baseline,
wherein the computing device uses information on a logical data flow during operation of the IACS, on a topology of the IACS, or the logical data flow during operation of the IACS and the topology of the IACS from a machine-readable configuration file of the IACS when generating the commands to set, verify, or set and verify the security configuration, and
commission the IACS before the IACS starts operating.

* * * * *